US012605850B2

(12) United States Patent (10) Patent No.: US 12,605,850 B2
Wang et al. (45) Date of Patent: Apr. 21, 2026

(54) MICRO ELECTRO-HYDRAULIC LINEAR ACTUATOR AND HAND OF ELECTRO-HYDRAULIC DRIVEN ROBOT

(71) Applicant: SHENZHEN SPHERICAL FLUID POWER TECHNOLOGY CO., LTD., Shenzhen (CN)

(72) Inventors: Luyi Wang, Shenzhen (CN); Yongzheng Guo, Shenzhen (CN); Yaowen Tan, Shenzhen (CN)

(73) Assignee: SHENZHEN SPHERICAL FLUID POWER TECHNOLOGY CO., LTD., Shenzhen (CN)

( * ) Notice: Subject to any disclaimer, the term of this patent is extended or adjusted under 35 U.S.C. 154(b) by 1036 days.

(21) Appl. No.: 17/725,753

(22) Filed: Apr. 21, 2022

(65) Prior Publication Data

US 2022/0241986 A1 Aug. 4, 2022

Related U.S. Application Data

(63) Continuation of application No. PCT/CN2020/122674, filed on Oct. 22, 2020.

(30) Foreign Application Priority Data

Oct. 22, 2019 (CN) .......................... 201911006603.1
Oct. 22, 2019 (CN) .......................... 201911006793.7

(51) Int. Cl.
 *B25J 15/10* (2006.01)
 *B25J 9/14* (2006.01)
 (Continued)

(52) U.S. Cl.
 CPC ........... *B25J 15/0009* (2013.01); *B25J 9/144* (2013.01); *F15B 15/20* (2013.01)

(58) Field of Classification Search
 CPC ........ B25J 15/00; B25J 15/0009; B25J 15/10; B25J 9/144; B25J 9/1612
 See application file for complete search history.

(56) References Cited

U.S. PATENT DOCUMENTS 4,988,259 A * 1/1991 Gabillet ............... B25J 15/0009
 901/22
5,410,944 A 5/1995 Cushman
 (Continued)

FOREIGN PATENT DOCUMENTS

CN 101107101 A 1/2008
CN 201283575 8/2009
 (Continued)

OTHER PUBLICATIONS

Alfayad et al., High performance integrated electro-hydraulic actuator for robotics—Part I: Principle, prototype design and first experiments, Sensors and Actuators A: Physical, 2011, 169, pp. 115-123, dated Mar. 5, 2011.

(Continued)

*Primary Examiner* — Sang K Kim
(74) *Attorney, Agent, or Firm* — Westbridge IP LLC

(57) ABSTRACT

Disclosed are a micro electro-hydraulic linear actuator and a hand of an electro-hydraulic driving robot, comprising an actuator base, a spherical pump unit and a reciprocating piston mechanism encapsulated in a closed elastic leather bag. The actuator base is provided with a hydraulic cylinder and a cylinder liner, both of which are cylindrical chambers with an open at one end. An open end of the hydraulic cylinder is provided with an end cover of the hydraulic cylinder, an open end of the cylinder liner is provided with an end cover of the motor, the reciprocating piston mechanism is provided in the hydraulic cylinder, and the spherical pump and motor are integrated in the cylinder liner to form (Continued)

a spherical pump unit; the present application adopts a distributed hydraulic source as the driving force and does not need a directional valve.

3 Claims, 12 Drawing Sheets

(51) Int. Cl.

| | | |
|---|---|---|
| *B25J 15/00* | (2006.01) | |
| *F15B 15/20* | (2006.01) | |

(56) References Cited

U.S. PATENT DOCUMENTS

| | | | | | |
|---|---|---|---|---|---|
| 6,048,235 | A | | 4/2000 | Kai | |
| 9,879,700 | B1 | * | 1/2018 | Jackowski | F15B 19/005 |
| 11,325,264 | B1 | * | 5/2022 | You | B25J 9/1075 |
| 11,331,811 | B1 | * | 5/2022 | Lo | B25J 15/0213 |
| 2004/0008853 | A1 | | 1/2004 | Pelrine et al. | |
| 2005/0022523 | A1 | | 2/2005 | Nagai et al. | |
| 2005/0087068 | A1 | | 4/2005 | Nagai et al. | |
| 2010/0147098 | A1 | * | 6/2010 | Park | B25J 9/104 |
| | | | | | 901/29 |
| 2020/0306964 | A1 | * | 10/2020 | Neville | B25J 9/1661 |
| 2021/0178579 | A1 | * | 6/2021 | Saunders | B25J 9/20 |
| 2022/0055229 | A1 | * | 2/2022 | Kim | B25J 15/0009 |

FOREIGN PATENT DOCUMENTS

| | | | |
|---|---|---|---|
| CN | 101537625 | A | 9/2009 |
| CN | 202971412 | U | 6/2013 |
| CN | 104454770 | A | 3/2015 |
| CN | 105179388 | A | 12/2015 |
| CN | 204961463 | U | 1/2016 |
| CN | 105937514 | A | 9/2016 |
| CN | 205600750 | U | 9/2016 |
| CN | 205799571 | U | 12/2016 |
| CN | 205918696 | U | 2/2017 |
| CN | 108161984 | A | 6/2018 |
| CN | 109707622 | A | 5/2019 |
| CN | 110640773 | A | 1/2020 |
| CN | 110685970 | A | 1/2020 |
| CN | 210769644 | U | 6/2020 |
| CN | 210968923 | U | 7/2020 |
| JP | 2006322501 | A | 11/2006 |

OTHER PUBLICATIONS

European Search Report issued in counterpart European Patent Application No. EP 20879973.4, dated Jan. 12, 2024.

Indian Search Report issued in counterpart Indian Patent Application No. IN 202227027163, dated Oct. 28, 2022.

International Search Report and Written Opinion issued in corresponding PCT Application No. PCT/CN2020/122674, dated Jan. 25, 2021.

First Office Action issued in counterpart Chinese Patent Application No. 201911006603.1, dated Dec. 18, 2024.

Notification to Grant Patent Right for Invention issued in counterpart Chinese Patent Application No. 201911006793.7, dated May 22, 2024.

* cited by examiner

MICRO ELECTRO-HYDRAULIC LINEAR ACTUATOR AND HAND OF ELECTRO-HYDRAULIC DRIVEN ROBOT

CROSS-REFERENCE TO RELATED APPLICATIONS

The present application is a continuation of International Application PCT/CN2020/122674, filed on Oct. 22, 2020, which claims priorities to Chinese Patent Application No. 201911006603.1, titled "Micro electro-hydraulic linear actuator" and Chinese Patent Application No. 201911006793.7, titled "Dexterous hand of electro-hydraulic driven robot", both filed on Oct. 22, 2019. The entire contents of the applications are incorporated herein by reference in their entireties.

TECHNICAL FIELD

The present application relates to the technology field of robots, in particular to a micro electro-hydraulic linear actuator and a hand of an electro-hydraulic driven robot therewith.

BACKGROUND

A humanoid robot is an automatic equipment integrating advanced technologies in many fields such as electronics, machinery, control, sensing and artificial intelligence. It represents the high-tech development level of a country. The humanoid robot has the appearance of human beings, can adapt to the living and working environment of human beings and complete various operations instead of human beings, and can expand human capabilities in many aspects. At present, the humanoid robot has developed rapidly at home and abroad, and has been widely used in many fields, such as service, medical treatment, education, entertainment and so on. As the end effector of humanoid robot, the hand can help human beings to complete a lot of work. However, at present, the bionic hand at home and abroad is still in the development stage, and there are few practical applications.

At present, the robot power system mainly includes the motor scheme composed of servo motor and precision reducer and the hydraulic driving scheme. The motor scheme is the mainstream application at current, which drives the fingers to grasp through the steel wire, tendon rope and connecting rod. However, due to the rigid connection structure of motor and reducer, the impact resistance is poor, and the maximum grasping force provided by fingertip is very small, usually less than 10N, so the application is limited. At the same time, since the system lacks flexibility, the motor power density is low, and the power is insufficient in some occasions. The core components of the hydraulic drive scheme are the oil pump, servo valve and oil cylinder connected through the oil pipeline. Hydraulic power drive can increase the flexibility of the system and greatly improve the driving force of the system, especially the grasping force on the fingertip can be doubled. Therefore, hydraulic drive is an application research direction of robot drive, but the current hydraulic drive mode generally adopts centralized hydraulic source, the main power pump drives more than ten hydraulic actuators for centralized energy supply, with a large volume, a heavy weight and complex hardware pipelines. After the robot loads the hydraulic components, there is almost no large load capacity for effective scene application, especially in the application of bionic robot, quadruped robot, robot joint, robot finger and so on. Due to that the driving force needs to overcome the self weight resistance, the hand of the robot has a huge volume, increased weight and large power loss, the application thus is greatly limited. For robot fingers, due to the complex system and large volume, the effective grasping force of the fingertip is very small, and even cannot be used.

Spherical pump is a newly invented power machine in recent years, which can realize ultra miniaturization and high pressure. It can realize series direct drive in the field of robot hand. Compared with the traditional line drive and push rod motor drive, it has the characteristics of large torque, impact resistance and ultra miniaturization. The application of spherical pump in power source of hand of the robot has a good application prospect.

SUMMARY

A purpose of the present application is to design a micro electro-hydraulic linear actuator, which integrates pump, motor and hydraulic piston, adopts modular design, and acts as a distributed hydraulic source to provide power for the robot.

Another purpose of the present application is to design a hand of an electro-hydraulic driving robot, which adopts a spherical pump electro-hydraulic integrated modular ultra micro electro-hydraulic linear driver, a sensor is provided on the finger, an ultra micro electro-hydraulic linear driver is provided on the knuckle of each finger, and the distributed hydraulic pressure source is directly driven in series, so as to realize the flexible action of each finger of the hand of the robot, increase the grasping force of the fingertip and withstand the impact load, convenient control.

In order to achieve the above purpose, the present application provides a micro electro-hydraulic linear actuator, comprising: an actuator base, a spherical pump unit and a reciprocating piston mechanism; the actuator base being provided with a hydraulic cylinder and a cylinder liner; each of the hydraulic cylinder and the cylinder liner having a cylindrical chambers with an opening at one end, the reciprocating piston mechanism being provided in the hydraulic cylinder, and an opening end of the hydraulic cylinder being provided with an end cover of the hydraulic cylinder; a piston rod hinge hole being provided at an end of a piston rod of the reciprocating piston mechanism extending out from a bottom of the hydraulic cylinder, and an actuator hinge hole being provided on an end cover of the hydraulic cylinder; an open end of the cylinder liner being provided with an end cover of the motor; the spherical pump unit comprising a spherical pump and a motor, and the spherical pump and the motor being integrated in the cylinder liner; a first inlet-outlet hole and a second inlet-outlet hole of the spherical pump being respectively communicated with two working chambers in the hydraulic cylinder of the reciprocating piston mechanism; and the micro electro-hydraulic linear actuator being encapsulated in a closed elastic leather bag, and the end of the piston rod extending out from the elastic leather bag.

The present application provides a hand of an electro-hydraulic driving robot, comprising a palm, a thumb, an index finger, a middle finger, a ring finger and a little finger; structures of the index finger, the middle finger, the ring finger and the little finger being the same and all comprising a first knuckle, a second knuckle and a third knuckle hinged in turn; the first knuckle being hinged on the palm through a knuckle swing support; a knuckle micro electro-hydraulic linear actuator being respectively provided in the first knuckle, the second knuckle and the third knuckle; a piston rod of the knuckle micro electro-hydraulic linear actuator in the third knuckle being hinged with the second knuckle; a piston rod of the knuckle micro electro-hydraulic linear actuator in the second knuckle being hinged with the first knuckle; a piston rod of the knuckle micro electro-hydraulic linear actuator in the first knuckle being hinged with the knuckle swing support to form a connecting rod mechanism to transmit power; a corresponding knuckle being driven to bend and stretch back and forth when the piston rod of each knuckle micro electro-hydraulic linear actuator in the first knuckle, the second knuckle and the third knuckle expands and contracts; and the thumb comprising a thumb base, a first knuckle of the thumb and a second knuckle of the thumb hinged in turn; the first knuckle of the thumb being hinged on the thumb base through a thumb swing support; a thumb micro electro-hydraulic linear actuator being respectively provided in the thumb base, the first knuckle of the thumb and the second knuckle of the thumb; the piston rod of the thumb micro electro-hydraulic linear actuator in the second knuckle of the thumb being hinged with the first knuckle of the thumb; the piston rod of the thumb micro electro-hydraulic linear actuator in the first knuckle of the thumb being hinged with the thumb base through the thumb swing support to form a connecting rod mechanism to transmit power; corresponding knuckles being driven to bend and stretch back and forth when the piston rod of the thumb micro electro-hydraulic linear actuator in the thumb base expands and contracts; the thumb swinging left and right in a plane of the palm when the piston rod of the thumb micro electro-hydraulic linear actuator in the thumb base expands and contracts;

five palm micro electro-hydraulic linear actuators being provided in the palm; the five palm micro electro-hydraulic linear actuators being a first palm micro electro-hydraulic linear actuator, a second palm micro electro-hydraulic linear actuator, a third palm micro electro-hydraulic linear actuator, a fourth palm micro electro-hydraulic linear actuator and a fifth palm micro electro-hydraulic linear actuator, wherein the first palm micro electro-hydraulic linear actuator is configured to control the thumb base, the thumb base is hinged on the palm; the piston rod of the first palm micro electro-hydraulic linear actuator in the palm is hinged with the thumb base to form a connecting rod mechanism to transmit power; the thumb is driven to rotate back and forth to a center of the palm when a piston rod of the first palm micro electro-hydraulic linear actuator expands and contracts; the second palm micro electro-hydraulic linear actuator, the third palm micro electro-hydraulic linear actuator, the fourth palm micro electro-hydraulic linear actuator and the fifth palm micro electro-hydraulic linear actuator are respectively configured to control the index finger, the middle finger, the ring finger and the little finger;

each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator are hinged with a palm swing support; each palm wing support is hinged with a corresponding index finger, the middle finger, the ring finger and the first knuckle of the little finger to form a connecting rod mechanism to transmit power; when each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator expands and contracts; corresponding index finger, middle finger, ring finger and little finger hinged therewith is driven to swing left and right in the plane of the palm;

sensors are provided on fingertips of the third knuckle and the second knuckle of the thumb, and each sensor, each knuckle micro electro-hydraulic linear actuator, each thumb micro electro-hydraulic linear actuator and each palm micro electro-hydraulic linear actuator are electrically connected with a controller of the robot respectively;

wherein the knuckle micro electro-hydraulic linear actuator, the thumb micro electro-hydraulic linear actuator and the palm micro electro-hydraulic linear actuator are all micro electro-hydraulic linear actuators according to claim 1, and the knuckle swing support, the thumb swing support and the palm swing support have the same structure.

The present application provides a hand of an electro-hydraulic driving robot, comprising: a palm, a thumb, an index finger, a middle finger, a ring finger and a little finger; structures of the index finger, the middle finger, the ring finger and the little finger being the same and all comprising a first knuckle, a second knuckle and a third knuckle hinged in turn; the first knuckle being hinged on the palm through a knuckle swing support; a knuckle micro electro-hydraulic linear actuator being respectively provided in the first knuckle, the second knuckle and the third knuckle; a piston rod of the knuckle micro electro-hydraulic linear actuator in the third knuckle being hinged with the second knuckle; a piston rod of the knuckle micro electro-hydraulic linear actuator in the second knuckle being hinged with the first knuckle; a piston rod of the knuckle micro electro-hydraulic linear actuator in the first knuckle being hinged with the knuckle swing support to form a connecting rod mechanism to transmit power; a corresponding knuckle being driven to bend and stretch back and forth when the piston rod of each knuckle micro electro-hydraulic linear actuator in the first knuckle, the second knuckle and the third knuckle expands and contracts; and the thumb comprising a thumb base, a first knuckle of the thumb and a second knuckle of the thumb hinged in turn; the first knuckle of the thumb being hinged on the thumb base through a thumb swing support; a thumb micro electro-hydraulic linear actuator being respectively provided in the thumb base, the first knuckle of the thumb and the second knuckle of the thumb; the piston rod of the thumb micro electro-hydraulic linear actuator in the second knuckle of the thumb being hinged with the first knuckle of the thumb;

the piston rod of the thumb micro electro-hydraulic linear actuator in the first knuckle of the thumb being hinged with the thumb base through the thumb swing support to form a connecting rod mechanism to transmit power; corresponding knuckles being driven to bend and stretch back and forth when the piston rod of the thumb micro electro-hydraulic linear actuator in the thumb base expands and contracts; the thumb swinging left and right in a plane of the palm when the piston rod of the thumb micro electro-hydraulic linear actuator in the thumb base expands and contracts;

five palm micro electro-hydraulic linear actuators being provided in the palm; the five palm micro electro-hydraulic linear actuators being a first palm micro electro-hydraulic linear actuator, a second palm micro electro-hydraulic linear actuator, a third palm micro electro-hydraulic linear actuator, a fourth palm micro electro-hydraulic linear actuator and a fifth palm micro electro-hydraulic linear actuator, wherein the first palm micro electro-hydraulic linear actuator is configured to control the thumb base, the thumb base is hinged on the palm; the piston rod of the first palm micro electro-hydraulic linear actuator in the palm is hinged with the thumb base to form a connecting rod mechanism to transmit power; the thumb is driven to rotate back and forth to a center of the palm when a piston rod of the first palm micro electro-hydraulic linear actuator expands and contracts; the second palm micro electro-hydraulic linear actuator, the third palm micro electro-hydraulic linear actuator, the fourth palm micro electro-hydraulic linear actuator and the fifth palm micro electro-hydraulic linear actuator are respectively configured to control the index finger, the middle finger, the ring finger and the little finger;

each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator are hinged with a palm swing support; each palm wing support is hinged with a corresponding index finger, the middle finger, the ring finger and the first knuckle of the little finger to form a connecting rod mechanism to transmit power; when each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator expands and contracts; corresponding index finger, middle finger, ring finger and little finger hinged therewith is driven to swing left and right in the plane of the palm;

sensors are provided on fingertips of the third knuckle and the second knuckle of the thumb, and each sensor, each knuckle micro electro-hydraulic linear actuator, each thumb micro electro-hydraulic linear actuator and each palm micro electro-hydraulic linear actuator are electrically connected with a controller of the robot respectively.

Compared with the prior art, the advantages of the present application are as follows:

The micro electro-hydraulic linear actuator of the present application adopts the distributed hydraulic source as the driving force, does not need the directional valve, and can realize the integrated design of pump motor and cylinder. The system does not need to arrange complex oil pipeline, with small volume and high power density, and increases the effective hydraulic energy output and the flexibility of system movement, and can bear the impact load. Modular design is adopted, which is convenient for mass production, manufacturing, maintenance and use.

The hand of the electro-hydraulic driving robot of the present application adopts the distributed hydraulic source as the driving force, the spherical pump electro-hydraulic linear actuator has small volume and large output power, and a micro electro-hydraulic linear driver is arranged in the parts where each finger joint needs to move, which reduces the volume of each driving system, increases the flexibility of finger movement, can bear the impact load and increases the grasping force of the finger.

BRIEF DESCRIPTION OF THE DRAWINGS

The specific embodiment of the present application is described in further detail below in combination with the accompanying drawings.

DETAILED DESCRIPTION OF THE EMBODIMENTS

Figure 1:
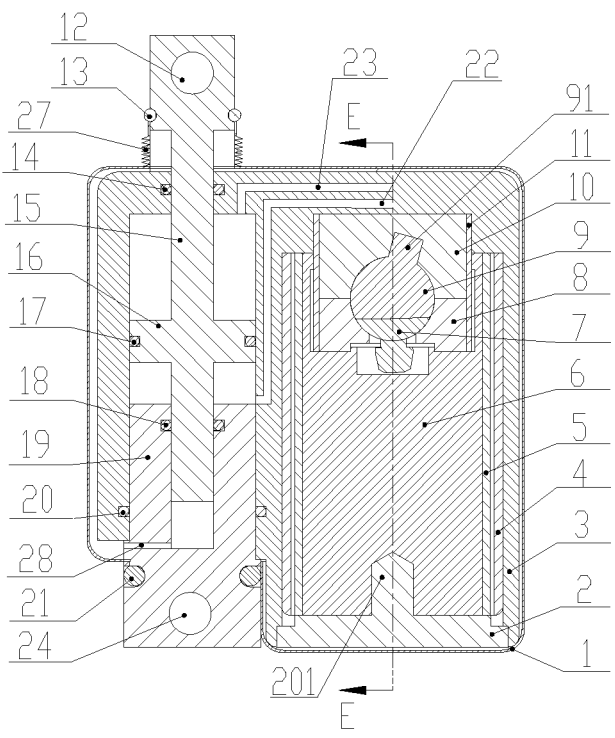
FIG. 1 is a structural view of a first embodiment of a micro electro-hydraulic linear actuator.

In order to have a clearer understanding of the technical solution, purpose and effect of the present application, the specific embodiment of the present application is described in combination with the accompanying drawings.

First Embodiment

As shown in FIG. 1, FIG. 3, FIG. 5 and FIG. 6, the micro electro-hydraulic linear actuator 1000 is a super micro structure. "micro" means that the overall dimension of the electro-hydraulic linear actuator is very small and can be set in each knuckle of the finger and the palm 100. The typical overall dimension of the micro electro-hydraulic linear actuator 1000 in the present application is a rectangle with a length of 12 mm, a width of 8 mm and a height of 15 mm. The micro electro-hydraulic linear actuator 1000 includes an actuator base 3, a spherical pump unit and a reciprocating piston mechanism. The actuator base 3 is provided with a hydraulic cylinder 25 and a cylinder liner 26, both of which have cylindrical chambers with an open at one end. An open end of the hydraulic cylinder 25 is provided with an end cover of the hydraulic cylinder 19; a sealing ring III 20 is provided at a fitting position between the end cover of the hydraulic cylinder 19 and the hydraulic cylinder 25. The reciprocating piston mechanism is a double piston rod mechanism. The reciprocating piston mechanism is provided in the hydraulic cylinder 25. A diameter of the piston 16 of the reciprocating piston mechanism is matched with a diameter of the cylindrical inner chamber of the hydraulic cylinder 25. The piston sealing ring V17 is provided at a fitting position between the piston 16 and the hydraulic cylinder 25, so as to form two working chambers with a variable volume in the hydraulic cylinder 25. The piston rod 15 on a side of the piston 16 extends from a piston rod through hole at a bottom of the cylindrical inner chamber of the hydraulic cylinder 25. A sealing ring I 14 is provided at a fitting position of the piston rod 15 and a through hole on the actuator base 3, the piston rod 15 on another side of the piston 16 slides in the hole (the piston rod hole) in a center of the end cover of the hydraulic cylinder 19. A sealing ring II 18 is provided at a fitting position of the piston rod 15 and the end cover of the hydraulic cylinder 19. A balance hole 28 is provided at a bottom of the piston rod hole on the end cover of the hydraulic cylinder 19, and the balance hole 28 is communicated with a gap formed by the elastic leather bag 1 and the actuator base 3. A piston rod hinge hole 12 is provided at an end of the piston rod 15 and extending from a bottom of the hydraulic cylinder 25, and the piston rod hinge hole 12 is configured to hinge an end of the piston rod 15 with other components to transmit power. The end cover of the hydraulic cylinder 19 is provided with an actuator hinge hole 24, which is configured to hinge the micro electro-hydraulic linear actuator 1000 with other components.

The spherical pump and the motor are integrated into the cylinder liner 26 to form a spherical pump unit, and the open end of the cylinder liner 26 is provided with an end cover of the motor 2. The spherical pump comprises a cylinder body 8, a cylinder cover 10, a spherical pump piston 9, a rotary table 7 and a spherical pump main shaft 6. Both the cylinder cover 10 and the cylinder body 8 have a hemispherical inner chamber, and the two hemispherical inner chambers are connected to form a spherical inner chamber. After the cylinder cover 10 is combined with the cylinder body 8, a sleeve 11 is fastened on an outer circumference of the cylinder cover 10 and the cylinder body 8 by hot fitting, and then the sleeve 11 is fastened on an inner circumference at a bottom of the cylindrical chamber of the cylinder liner 26 by hot fitting. The cylinder cover 10 is provided with a piston shaft hole and two inlet-outlet holes. The two inlet-outlet holes are a first inlet-outlet hole 101 and a second inlet-outlet hole 102 respectively. Because the spherical pump can operate in clockwise direction as well as in counterclockwise direction, when the motor rotates in the clockwise direction, the first inlet-outlet hole 101 is an inlet hole and the second inlet-outlet hole 102 is an outlet hole. When the motor rotates in the counterclockwise direction, the first inlet-outlet hole 101 is an outlet hole and the second inlet-outlet hole 102 is an inlet hole.

The spherical pump piston 9 is hinged with the rotary table 7 through the cylindrical hinge to form a spherical rotor, which is placed in the spherical inner chamber. The coil winding of the motor stator 4 is fixed on an inner wall of the open end of the cylindrical chamber of the cylinder liner 26, the silicon steel sheet of the rotor 5 of the motor surrounds an outer circumference of the main shaft 6, and the end cover 2 of the motor is fixedly connected to the open end of the cylindrical chamber of the cylinder liner 26 through hot interference fitting. A rotary support is formed between the upper end of the main shaft 6 of the spherical pump and the sleeve 11 of the spherical pump, and a rotary support is formed between a lower end of the main shaft 6 and the end cover of the motor 2. Specifically, a sliding fit is provided at a fitting position between the upper end of the main shaft 6 and the sleeve 11 to form a rotary support at the upper end of the main shaft 6. A central shaft hole 62 is provided at a lower end of the main shaft 6, and a support shaft 201 fitted with the central shaft hole 62 at the lower end of the main shaft 6 is provided on the end cover of the motor 2. The support shaft 201 can rotate in the central shaft hole to form a rotary support at the lower end of a main shaft 6 of the spherical pump.

The micro electro-hydraulic linear actuator 1000 is encapsulated in a closed elastic leather bag 1 filled with hydraulic oil, and the end of the piston rod 15 extends out from the elastic leather bag 1. A telescopic sleeve 27 and a sealing ring 13 are provided at a connecting position between an end of the piston rod 15 extending out from the elastic leather bag 1 and the elastic leather bag 1. The sealing ring 13 is fixedly clamped at the head of the piston rod 15, and the telescopic sleeve 27 is connected between the sealing ring 13 and the elastic leather bag 1. In practical application, in order to facilitate installation, the actuator hinge hole 24 on the end cover of the hydraulic cylinder 19 is exposed from the elastic leather bag 1, and a sealing ring VI 21 is provided at a fitting position between the end cover of the hydraulic cylinder 19 and the elastic leather bag 1. The sealing ring VI 21 is configured to fix the elastic leather bag 1 on the actuator base 3 and seal the liquid between the elastic leather bag 1 and the actuator base 3.

Figure 9:
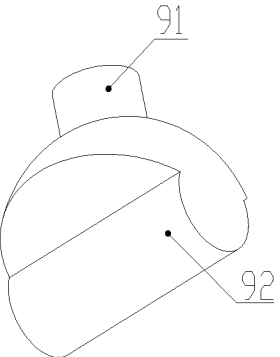
FIG. 9 is a structural view of a spherical pump piston.
Figure 10:
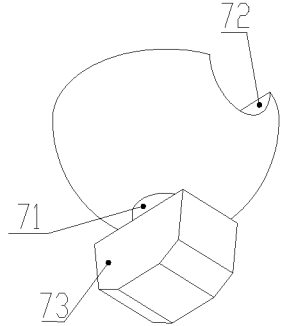
FIG. 10 is a structural view of a rotary table.
Figure 11:
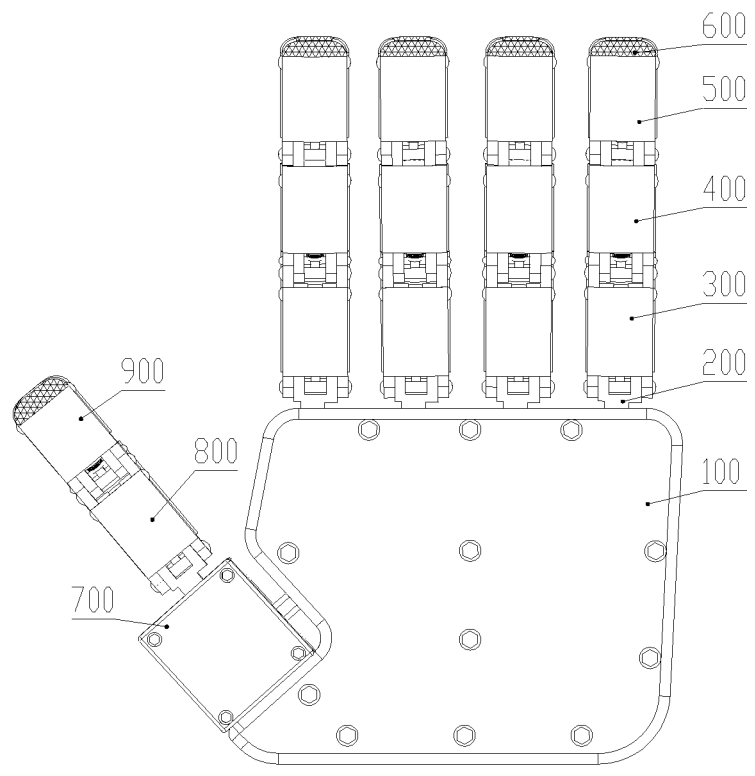
FIG. 11 is a schematic structural view of an appearance structure of the hand of the electro-hydraulic driving robot.
Figure 12:
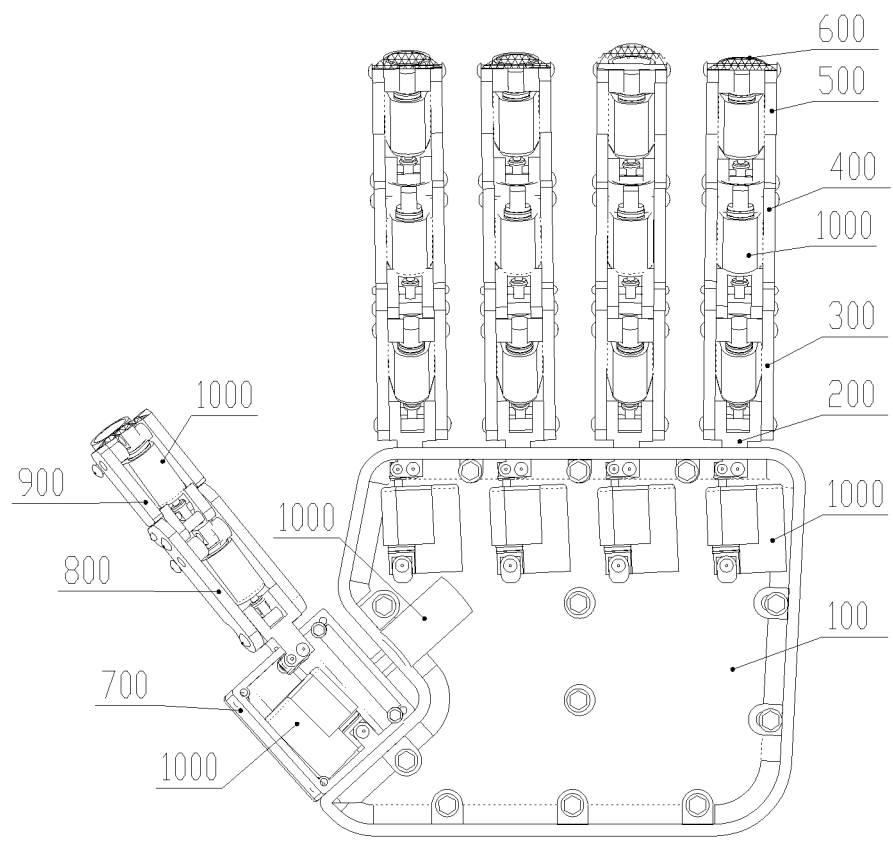
FIG. 12 is a structural view of a skeleton of a hand of the electro-hydraulic driving robot (with a palm guard and finger guards being removed).
Figure 13:
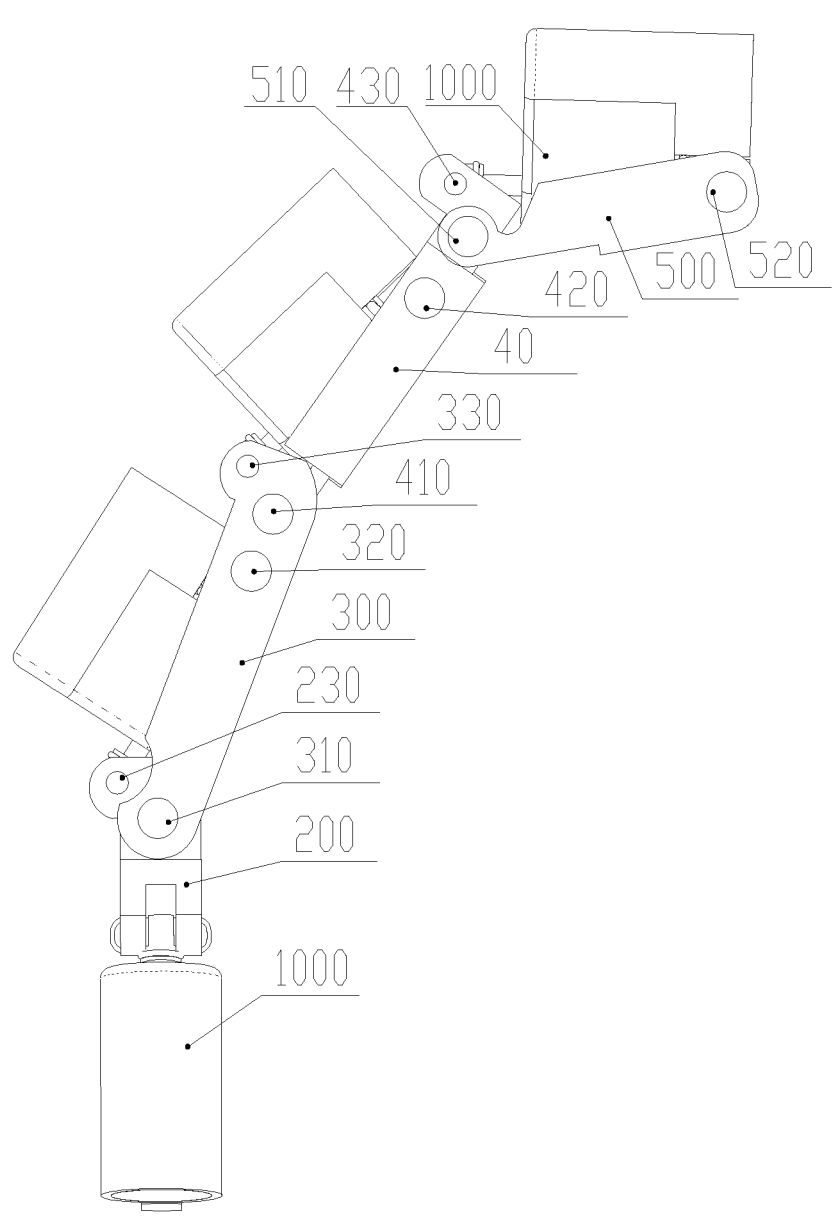
FIG. 13 is a front view of an index finger of the hand of the electro-hydraulic driving robot.
Figure 14:
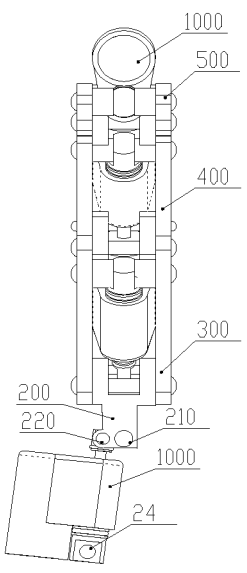
FIG. 14 is a right view of the index finger shown in FIG. 13.

As shown in FIGS. 9 to 10, the spherical pump piston 9 has a spherical top surface and two side surface formed a certain angle α therebetween (angle α is generally ranges from 10° to 25°) and a semi cylindrical piston pin seat 92 at a lower part of the both side surfaces. The spherical top surface of the spherical pump piston 9 has the same spherical center with the spherical inner chamber and forms a sealing dynamic fit. A piston shaft 91 protrudes from a center of the spherical top surface of the spherical pump piston 9, and the axis of the piston shaft 91 passes through a spherical center of the spherical top surface of the spherical pump piston 9. The rotary table 7 of the spherical pump has a rotary table pin seat 72 corresponding to the piston pin seat 92 at an upper part thereof. The outer peripheral surface between the upper end surface and lower end surface of the rotary table 7 of the spherical pump is a rotary table spherical surface, rotary table spherical surface has the same spherical center as the spherical inner chamber, tightly contacts the spherical inner chamber to form a sealed dynamic fit with the spherical inner chamber. The rotary table pin seat 72 is a semi cylindrical groove fitted with the piston pin seat 92. A rotary table shaft 71 protrudes from a center of the lower end of the rotary table 7. The rotary table shaft 71 passes through the spherical center of the spherical surface of the rotary table, and a slipper 73 is provided at the end of the rotary table shaft 71 of the rotary table 7. A height of the semi cylindrical groove of the rotary table pin seat 72 is slightly higher than a center line of the semi cylinder, that is, the depth dimension of the semi cylindrical groove is slightly larger than the radius of the semi cylinder, that is, the section shape of the semi cylindrical groove is of a major arc shape, and the semi cylinder of the piston pin seat 92 needs to be inserted into the semi cylindrical groove of the rotary table pin seat 72 from the end of the cylinder to form a cylindrical hinge. The cylindrical hinge in this embodiment is a sleeve structure of C shape, and the circular arc of the groove part of the rotary table pin seat 72 of the rotary table 7 is wrapped on the outer cylindrical surface of the piston pin seat 92 to enable a rotation around a center line of the cylinder. In practical application, the cylindrical hinge can also be a hinge formed by other cylindrical forms.

Figure 7:
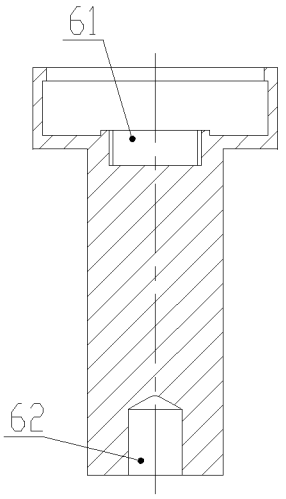
FIG. 7 is a front view of a main shaft structure.
Figure 8:
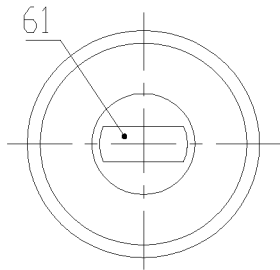
FIG. 8 is a top view of the main shaft structure.

The rotary shaft 71 of the rotary table 7 extends from a lower opening of the cylinder 8 and is movably connected with the upper end surface of the main shaft 6. As shown in FIGS. 7 to 8, a sliding groove 61 is provided on the upper end surface of the main shaft 6 of the spherical pump, the slipper 73 is fitted with the sliding groove 61, and the slipper 73 on the rotary table shaft 71 is inserted into the sliding groove 61 on the main shaft 6 to slide. The axes of the piston shaft hole and the rotary table shaft 71 pass through the spherical center of the spherical inner chamber, and the included angle between the axis of the piston shaft hole and the rotary table shaft 71 is a.

When the main shaft 6 of the spherical pump rotates, the rotary table 7 and the spherical pump piston 9 are driven to rotate in the spherical inner chamber of the spherical pump; the slipper 73 of the rotary table 7 swings back and forth in the sliding groove 61 of the main shaft 6; the rotary table 7 and the spherical pump piston 9 swing relative to each other, and V1 and V2 working chambers with variable volume are formed between an upper end surface of the rotary table 7, the two side surfaces of the spherical pump piston 9 and the spherical inner chamber. The two inlet-outlet holes (i.e., the first inlet-outlet hole 101 and the second inlet-outlet hole 102) of the cylinder cover 10 are respectively connected with the two working chambers on both side of the hydraulic cylinder 25 of the piston 16 of the reciprocating piston mechanism through the first inlet-outlet channel 22 and the second inlet-outlet channel 23 provided in the actuator base 3 (two working chambers on both sides of the piston of the reciprocating piston mechanism are provided with inlet-outlet holes. One working chamber is provided with an inlet hole, and the other working chamber is provided with an outlet hole. The outlet hole of the spherical pump is connected with the inlet hole of the reciprocating piston mechanism, and the inlet hole of the spherical pump is connected with the outlet hole of the reciprocating piston mechanism). That is, the two inlet-outlet holes on the cylinder cover 10 of the spherical pump are respectively communicated with the working chambers on both sides of the piston 16 of the reciprocating piston mechanism.

Second Embodiment

Figure 2:
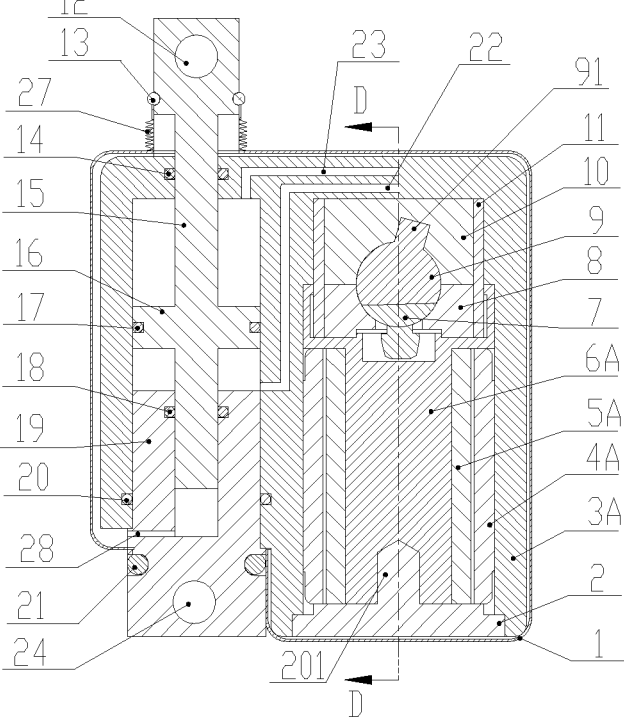
FIG. 2 is a structural view of a second embodiment of the micro electro-hydraulic linear actuator.
Figure 3:
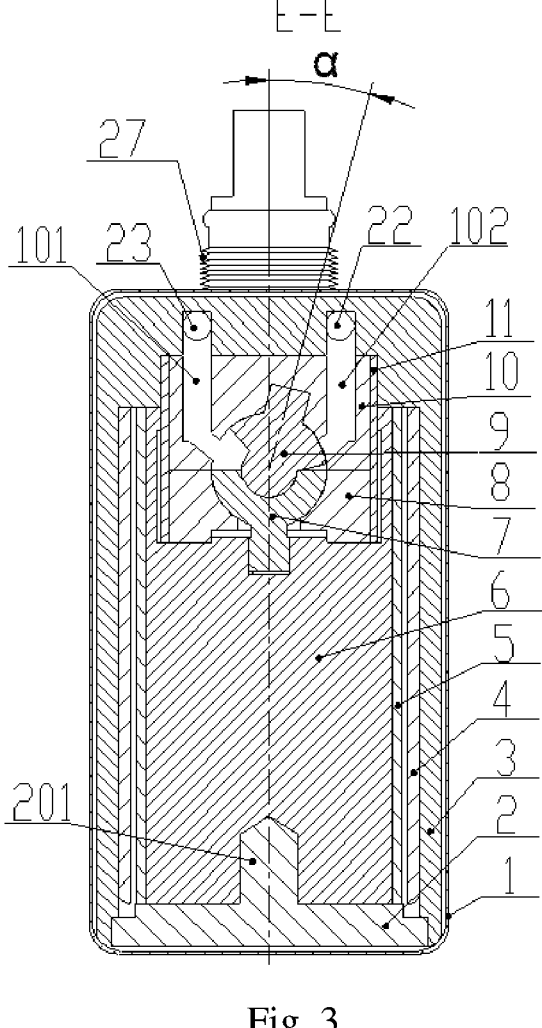
FIG. 3 is a sectional view along line E-E in FIG. 1.
Figure 4:
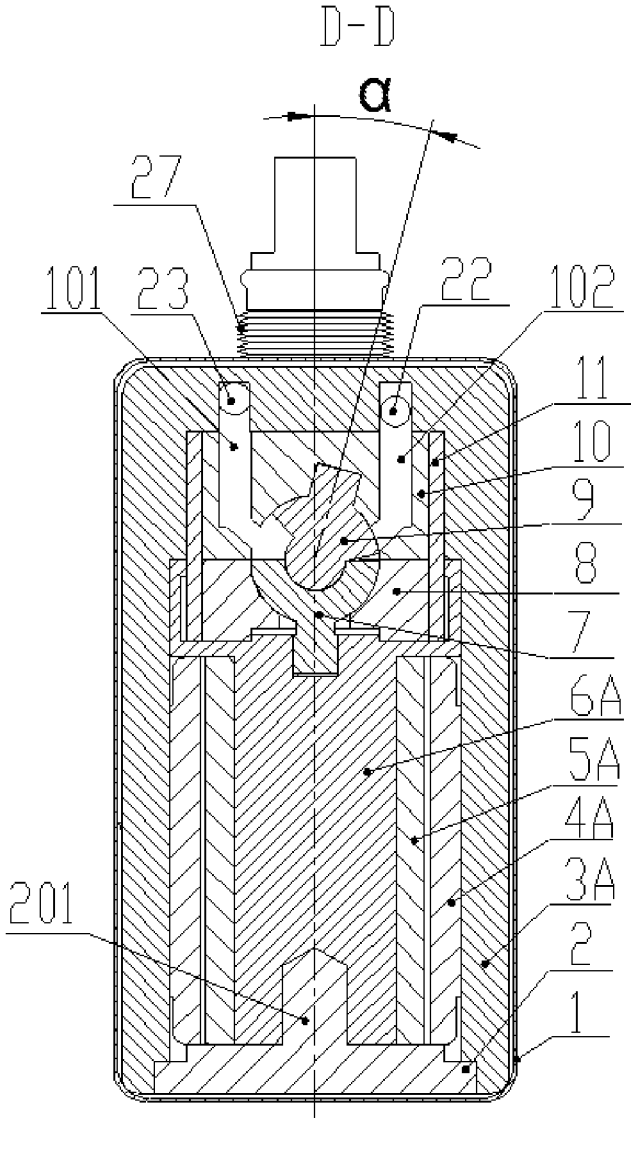
FIG. 4 is a sectional view along line D-D in FIG. 2.
Figure 5:
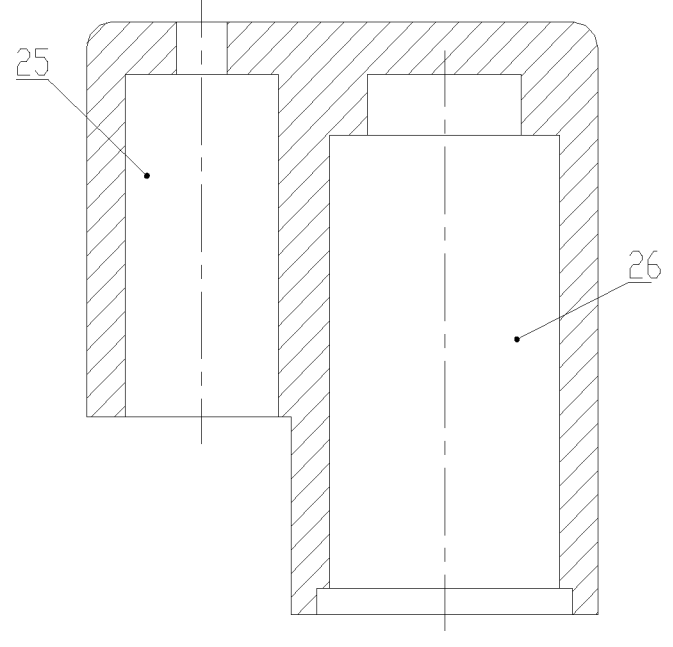
FIG. 5 is a structural view of an actuator base.
Figure 6:
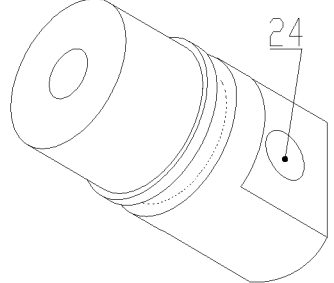
FIG. 6 is a structural view of an end cover of the hydraulic cylinder.

As shown in FIG. 2 and FIG. 4, in the second embodiment of the present application, except that the main shaft I 6A, the actuator base I 3A, the stator I 4A of the motor and the rotor I 5A of the motor are slightly different from the first embodiment, the others are exactly the same. In the second embodiment, the shaft diameter of the main shaft I 6A is smaller than that of the main shaft 6 in the first embodiment, the axial dimensions of the stator I 4A and the rotor I 5A of the motor are shorter than that of the stator 4 and the rotor 5 of the motor in the first embodiment. The rotor I 5A of the motor is provided on the outer circumference of the shaft at the lower end of the main shaft I 6A, and the stator I 4A of the motor and the rotor I 5A of the motor are opposite to each other in a radial direction. The stator I 4A of the motor is fitted with the actuator base I 3A, and the stator I 4A of the motor is fixedly provided on an inner wall of the cylindrical inner chamber of the open end of the spherical pump cylinder liner of the actuator base I 3A. This structure can compress a radial dimension of the main shaft of the spherical pump unit.

In the first embodiment, the radial dimension of the main shaft 6 is larger, the sleeve 11 of the spherical pump, together with the cylinder body 8 and the cylinder cover 10, is mainly contained in the chamber formed at the upper end of the main shaft 6, the axial length dimension of the rotor 5 and the stator 4 of the motor is larger, and the electromagnetic force is formed on the full axial length of the main shaft 6. Under the same volume, the structural form of the first embodiment facilitates the spherical pump to obtain a larger motor torque and a larger driving force. Therefore, the first embodiment is the preferred structure of the present application.

Third Embodiment

As shown in FIGS. 11 to 14, the hand of the electro-hydraulic driving robot is a five finger structure, including a palm 100, a thumb, an index finger, a middle finger, a ring finger and a little finger. The structures of the index finger, the middle finger, the ring finger and the little finger are the same, and all include a first knuckle 300, a second knuckle 400 and a third knuckle 500 hinged in turn. The first knuckles of the index finger, the middle finger, the ring finger and the little finger are hinged on the palm 100 through a swing support 200 (i.e., knuckle swing support). A micro electro-hydraulic linear actuator 1000 (i.e., a knuckle micro electro-hydraulic linear actuator) is hinged in each of the first knuckle 300, the second knuckle 400 and the third knuckle 500.

The swing support 200 is provided with a swing support and palm hinge hole 210, a swing support and piston rod hinge hole I 220 (for hinge with the piston rod 15 of the micro electro-hydraulic linear actuator 1000 in the palm 100), and a swing support and piston rod hinge hole II 230 (for hinge with the piston rod 15 of the micro electro-hydraulic linear actuator 1000 in the first knuckle 300). The first knuckle 300 is provided with a first knuckle and swing support hinge hole 310, a first knuckle and micro electro-hydraulic linear actuator hinge hole 320, and a first knuckle and piston rod hinge hole 330. The second knuckle 400 is provided with a second knuckle and first knuckle hinge hole 410, a second knuckle and micro electro-hydraulic linear actuator hinge hole 420, and a second knuckle and piston rod hinge hole 430. The third knuckle 500 is provided with a third knuckle and second knuckle hinge hole 510, and a third knuckle and micro electro-hydraulic linear actuator hinge hole 520. In addition, the swing support 200 is also provided with a hinge hole connected with the first knuckle 300 (fitted with the first knuckle and the swing support hinge hole 310), the first knuckle 300 is also provided with a hinge hole connected with the second knuckle 400 (fitted with the second knuckle and first knuckle hinge hole 410), and the second knuckle 400 is also provided with a hinge hole connected with the third knuckle 500 (fitted with the third knuckle and second knuckle hinge hole 510).

The piston rod 15 of the micro electro-hydraulic linear actuator 1000 is provided with a piston rod hinge hole 12, which is configured to hinge the end of the piston rod 15 with other components to transmit power. The end cover of the hydraulic cylinder 19 of the micro electro-hydraulic linear actuator 1000 is provided with an actuator hinge hole 24, which is configured to hinge the micro electro-hydraulic linear actuator 1000 with other components.

The piston rod 15 of the micro electro-hydraulic linear actuator 1000 in the third knuckle 500 is hinged with the second knuckle 400, the piston rod 15 of the micro electro-hydraulic linear actuator 1000 in the second knuckle 400 is hinged with the first knuckle 300, and the piston rod 15 of the micro electro-hydraulic linear actuator 1000 in the first knuckle 300 is hinged with the swing support 200, so as to form a connecting rod mechanism to transmit power, the piston rod 15 of the micro electro-hydraulic linear actuator 1000 in each of the first knuckle 300, the second knuckle 400 and the third knuckle 500 drives the corresponding knuckle to bend and stretch back and forth.

Five, from a first to a fifth micro electro-hydraulic linear actuators 1000 (i.e., palm micro electro-hydraulic linear actuator) are provided in the palm 100, that is, five micro electro-hydraulic linear actuators 1000 are provided in the palm 100. The five micro electro-hydraulic linear actuators 1000 are the first micro electro-hydraulic linear actuator, the second micro electro-hydraulic linear actuator, the third micro electro-hydraulic linear actuator, the fourth micro electro-hydraulic linear actuator and the fifth micro electro-hydraulic linear actuator. The first micro electro-hydraulic linear actuator 1000 is configured to control a thumb base 700, and the second to fifth micro electro-hydraulic linear actuators 1000 are configured to control the index finger, middle finger, ring finger and little finger respectively. The piston rod 15 of the second to fifth micro electro-hydraulic linear actuators 1000 is hinged with the swing support 200 (i.e., palm swing support), and each swing support 200 is hinged with the first knuckle 300 of the corresponding index finger, middle finger, ring finger or little finger to form a connecting rod mechanism to transmit power. When the piston rod 15 of the second to fifth micro electro-hydraulic linear actuators 1000 is retracted, the corresponding index finger, middle finger, ring finger and little finger swing left and right in the plane of the palm.

The swing supports 200 connected with the second to fifth micro electro-hydraulic linear actuators 1000 in the palm 100 are hinged with palm 100, the piston rod 15 of the micro electro-hydraulic linear actuator 1000 on the palm 100 and the first knuckle 300 and the piston rod 15 of the micro electro-hydraulic linear actuator 1000 on the first knuckle 300 through its four hinged holes. The first knuckle 300 is hinged with the swing support 200, the micro electro-hydraulic linear actuator 1000 on the first knuckle 300, the second knuckle 400 and the piston rod 15 of the micro electro-hydraulic linear actuator 1000 on the second knuckle 400 through four hinged holes thereon. The second knuckle 400 is hinged with the first knuckle 300, the micro electro-hydraulic linear actuator 1000 on the second knuckle 400, the third knuckle 500 and the piston rod 15 of the micro electro-hydraulic linear actuator 1000 on the third knuckle 500 through four hinged holes thereon. The third knuckle 500 is hinged with the second knuckle 400 and the micro electro-hydraulic linear actuator 1000 on the third knuckle 500 respectively through two hinged holes thereon.

Figure 18:
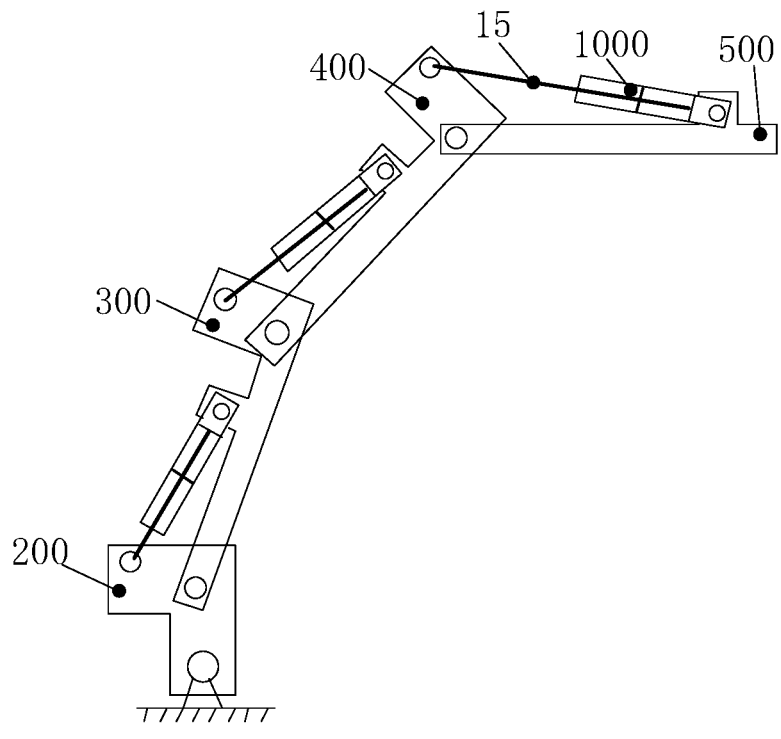
FIG. 18 is a structural view of a connecting rod when the index finger is bent or stretched back and forth.
Figure 19:
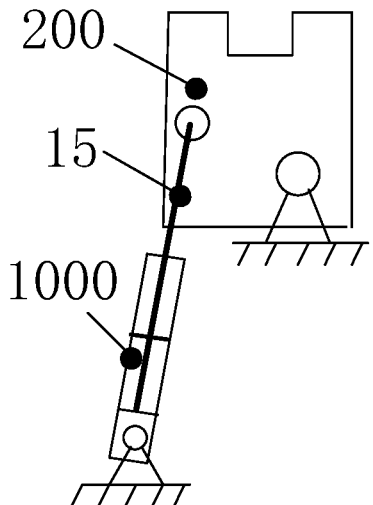
FIG. 19 is a structural view of the connecting rod when the index finger swings left and right.

As shown in FIGS. 18 to 19, the connecting rod structure of each knuckle of the index finger, middle finger, ring finger and little finger is as follows: the first knuckle 300, the piston rod 15 of the micro electro-hydraulic linear actuator 1000 and the swing support 200 form a connecting rod mechanism. The second knuckle 400, the piston rod 15 of the micro electro-hydraulic linear actuator 1000 and the first knuckle 300 form a connecting rod mechanism. The third knuckle 500, the piston rod 15 of the micro electro-hydraulic linear actuator 1000 and the second knuckle 400 form a connecting rod mechanism. The swing support 200, the palm 100 and the piston rod 15 of the micro electro-hydraulic linear actuator 1000 form a connecting rod mechanism.

Figure 15:
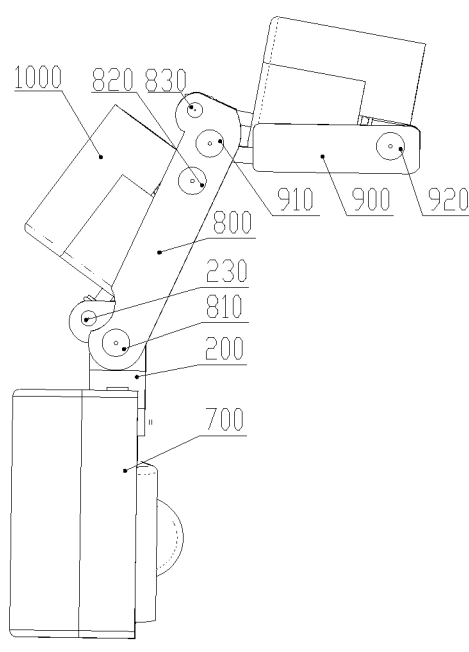
FIG. 15 is a front view of a thumb of the hand of the electro-hydraulic driving robot.
Figure 16:
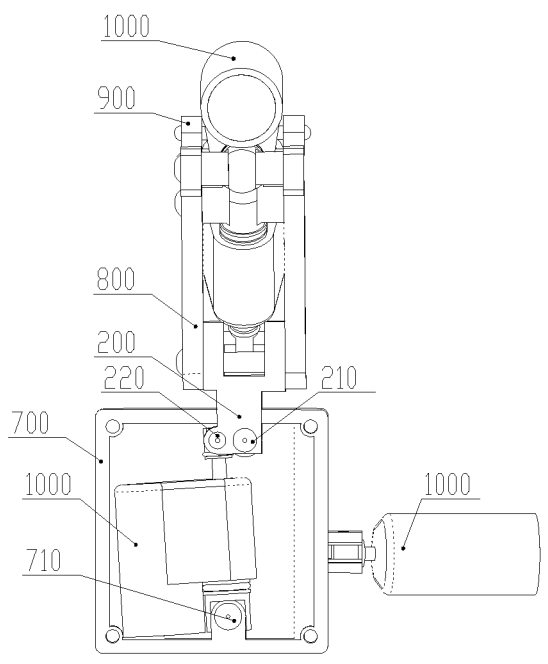
FIG. 16 is a right view of the thumb shown in FIG. 15.
Figure 17:
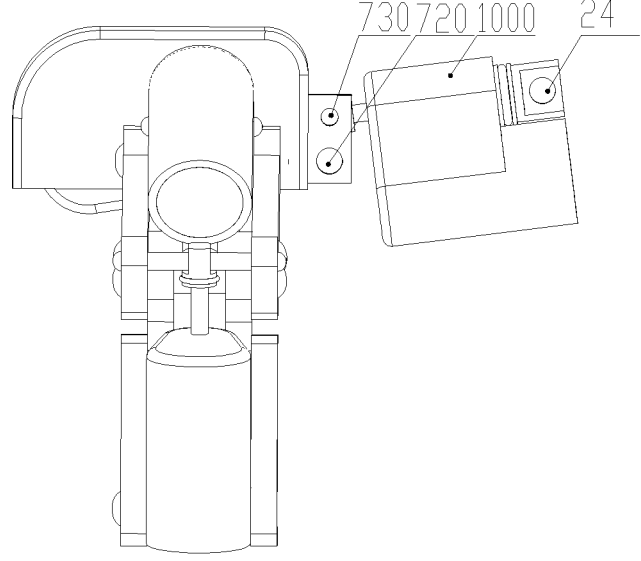
FIG. 17 is a top view of the thumb shown in FIG. 15.

As shown in FIGS. 15 to 17, the thumb comprises a thumb base 700, a first knuckle 800 of the thumb and a second knuckle 900 of the thumb hinged in turn. The first knuckle 800 of the thumb is hinged on the thumb base 700 through the swing support 200 (i.e., the thumb swing support), and a micro electro-hydraulic linear actuator 1000 is hinged on the thumb base 700, the first knuckle 800 of the thumb and the second knuckle 900 of the thumb respectively. The thumb base 700 is provided with a hole 710 for hinging the thumb base and the micro electro-hydraulic linear actuator, a hole 720 for hinging the thumb base and the palm, and a hole 730 for hinging the thumb base and the piston rod. The first knuckle 800 of the thumb is provided with a hole 810 for hinging the first knuckle of the thumb and the swing support, a hole 820 for hinging the first knuckle of the thumb and the micro electro-hydraulic linear actuator, and a hole 830 for hinging the first knuckle of the thumb and the piston rod; the second knuckle 900 of the thumb is provided with a hole 910 for hinging the second knuckle of the thumb and the first knuckle of the thumb, and a hole 920 for hinging second knuckle of the thumb and the micro electro-hydraulic linear actuator. In addition, the first knuckle 800 of the thumb is also provided with a hinge hole connected with the second knuckle 900 of the thumb (fitted with the hole 910 for hinging second knuckle of the thumb and first knuckle of the thumb), and the swing support 200 is also provided with a hinge hole connected with the first knuckle of the thumb (fitted with the hole 810 for hinging the first knuckle of the thumb and the swing support); and the thumb base 700 is also provided with a hinge hole connected with the swing support 200 (fitted with a hole 210 for hinging the swing support and the palm hinge).

The swing support 200 on the thumb base 700 is hinged with the thumb base 700, the piston rod 15 of the micro electro-hydraulic linear actuator 1000 on the thumb base 700, the first knuckle 800 of the thumb and the piston rod 15 of the micro electro-hydraulic linear actuator 1000 on the first knuckle 800 of the thumb through four hinged holes thereon. The thumb base 700 is hinged with the palm 100, the piston rod 15 of the first micro electro-hydraulic linear actuator 1000 in the palm 100, the micro electro-hydraulic linear actuator 1000 on the thumb base 700 and the first knuckle 800 of the thumb respectively. The first knuckle 800 of the thumb is hinged with the swing support 200 connected to the thumb base 700, the micro electro-hydraulic linear actuator 1000 on the first knuckle 800 of the thumb, the second knuckle 900 of the thumb and the piston rod 15 of the micro electro-hydraulic linear actuator 1000 on the second knuckle 900 of the thumb respectively. The second knuckle 900 of the thumb is hinged with the first knuckle 800 of the thumb and the micro electro-hydraulic linear actuator 1000 on the second knuckle 900 of the thumb respectively.

The piston rod 15 of the micro electro-hydraulic linear actuator 1000 in the second knuckle 900 of the thumb is hinged with the first knuckle 800 of the thumb, and the piston rod 15 of the micro electro-hydraulic linear actuator 1000 in the first knuckle 800 of the thumb is hinged with the thumb base 700 through the swing support 200 to form a connecting rod mechanism to transmit power. When the piston rod 15 of the micro electro-hydraulic linear actuator 1000 in the second knuckle 900 of the thumb is retracted, the corresponding knuckle can be bent and extended back and forth. When the piston rod 15 of the micro electro-hydraulic linear actuator 1000 in the thumb base 700 is retracted, the thumb can swing left and right in the palm plane. The thumb base 700 is hinged on the palm 100. The piston rod 15 of the first micro electro-hydraulic linear actuator 1000 in the palm

100 is hinged with the thumb base 700 to form a connecting rod mechanism to transmit power. When the piston rod 15 of the first micro electro-hydraulic linear actuator 1000 is retracted, the thumb can rotate back and forth to the palm.

A sensor 600 is provided on the fingertip of each finger, that is, on the fingertip of each of the third knuckles 500 and the second knuckle 900 of the thumb. The sensor 600 includes a position sensor and a force sensor. The position sensor is configured to sense the position change of the finger, and the force sensor is configured to detect the grasping force on the fingertip. Each sensor 600 and each micro electro-hydraulic linear actuator 1000 are electrically connected with a controller of the robot through wires. The controller controls the motor operation of the micro electro-hydraulic linear actuator 1000 according to robot commands, supplies power to the motor, receives and collects the information transmitted by the sensor 600, adjusts and generates new commands, and realizes the intelligent control of finger action.

It should be noted that the micro electro-hydraulic linear actuator 1000 mentioned in this embodiment adopts the micro electro-hydraulic linear actuator 1000 of the above first embodiment or the second embodiment. Therefore, for the specific structure and working principle of the micro electro-hydraulic linear actuator 1000, please refer to the above first embodiment or the second embodiment. The controller of the robot controls the motor to rotate to push the piston rod 15 to move back and forth, so as to realize the action of each finger of the hand.

In this embodiment, the hand of the robot includes five fingers, that is, the thumb, index finger, middle finger, ring finger and little finger are connected on the palm 100, and the structure of the index finger, middle finger, ring finger and little finger is the same. Therefore, other technical solutions of any one or more fingers lacking index finger, middle finger, ring finger or little finger on the palm 100 also fall into the technical scope of the present application. In addition, the lack of one or more of the third knuckle, the second knuckle or the second knuckle of the thumb, as long as the corresponding grasping action can be completed, also falls into the technical scope of the present application to be protected.

The above is only a schematic specific embodiment of the present application and is not used to determine the scope of the present application. The equivalent changes and modifications made by those skilled in the art without departing from the concept and principles of the present application shall belong to the protection scope of the present application. Moreover, it should be noted that the components of the present application are not only related to the above overall application, and the technical features described in the description of the present application can be used alone or in combination according to the actual needs. Therefore, the present application naturally covers other combinations and specific applications related to the inventive points of the present application.

The invention claimed is:

1. A hand of an electro-hydraulic driving robot, comprising a palm, a thumb, an index finger, a middle finger, a ring finger and a little finger; structures of the index finger, the middle finger, the ring finger and the little finger being the same and all comprising a first knuckle, a second knuckle and a third knuckle hinged in turn; the first knuckle being hinged on the palm through a knuckle swing support; a knuckle micro electro-hydraulic linear actuator being respectively provided in the first knuckle, the second knuckle and the third knuckle; a piston rod of the knuckle micro electro-hydraulic linear actuator in the third knuckle being hinged with the second knuckle; a piston rod of the knuckle micro electro-hydraulic linear actuator in the second knuckle being hinged with the first knuckle; a piston rod of the knuckle micro electro-hydraulic linear actuator in the first knuckle being hinged with the knuckle swing support to form a connecting rod mechanism to transmit power; a corresponding knuckle being driven to bend and stretch back and forth when the piston rod of each knuckle micro electro-hydraulic linear actuator in the first knuckle, the second knuckle and the third knuckle expands and contracts; and the thumb comprising a thumb base, a first knuckle of the thumb and a second knuckle of the thumb hinged in turn; the first knuckle of the thumb being hinged on the thumb base through a thumb swing support; a thumb micro electro-hydraulic linear actuator being respectively provided in the thumb base, the first knuckle of the thumb and the second knuckle of the thumb; the piston rod of the thumb micro electro-hydraulic linear actuator in the second knuckle of the thumb being hinged with the first knuckle of the thumb; the piston rod of the thumb micro electro-hydraulic linear actuator in the first knuckle of the thumb being hinged with the thumb base through the thumb swing support to form a connecting rod mechanism to transmit power; corresponding knuckles being driven to bend and stretch back and forth when the piston rod of the thumb micro electro-hydraulic linear actuator in the thumb base expands and contracts; the thumb swinging left and right in a plane of the palm when the piston rod of the thumb micro electro-hydraulic linear actuator in the thumb base expands and contracts;

five palm micro electro-hydraulic linear actuators being provided in the palm; the five palm micro electro-hydraulic linear actuators being a first palm micro electro-hydraulic linear actuator, a second palm micro electro-hydraulic linear actuator, a third palm micro electro-hydraulic linear actuator, a fourth palm micro electro-hydraulic linear actuator and a fifth palm micro electro-hydraulic linear actuator, wherein the first palm micro electro-hydraulic linear actuator is configured to control the thumb base, the thumb base is hinged on the palm; the piston rod of the first palm micro electro-hydraulic linear actuator in the palm is hinged with the thumb base to form a connecting rod mechanism to transmit power; the thumb is driven to rotate back and forth to a center of the palm when a piston rod of the first palm micro electro-hydraulic linear actuator expands and contracts; the second palm micro electro-hydraulic linear actuator, the third palm micro electro-hydraulic linear actuator, the fourth palm micro electro-hydraulic linear actuator and the fifth palm micro electro-hydraulic linear actuator are respectively configured to control the index finger, the middle finger, the ring finger and the little finger;

each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator are hinged with a palm swing support; each palm wing support is hinged with a corresponding index finger, the middle finger, the ring finger and the first knuckle of the little finger to form a connecting rod mechanism to transmit power; when each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator expands and contracts; corresponding index finger, middle finger, ring finger and little finger hinged therewith is driven to swing left and right in the plane of the palm;

sensors are provided on fingertips of the third knuckle and the second knuckle of the thumb, and each sensor, each knuckle micro electro-hydraulic linear actuator, each thumb micro electro-hydraulic linear actuator and each palm micro electro-hydraulic linear actuator are electrically connected with a controller of the robot respectively;

wherein the knuckle micro electro-hydraulic linear actuator, the thumb micro electro-hydraulic linear actuator and the palm micro electro-hydraulic linear actuator are all micro electro-hydraulic linear actuators, and the knuckle swing support, the thumb swing support and the palm swing support have the same structure;

each of the micro electro-hydraulic linear actuators comprises an actuator base, a spherical pump unit and a reciprocating piston mechanism; and the actuator base is provided with a hydraulic cylinder and a cylinder liner; each of the hydraulic cylinder and the cylinder liner has a cylindrical chambers with an opening at one end, the reciprocating piston mechanism is provided in the hydraulic cylinder, and an opening end of the hydraulic cylinder is provided with an end cover of the hydraulic cylinder; a piston rod hinge hole is provided at an end of a piston rod of the reciprocating piston mechanism extending out from a bottom of the hydraulic cylinder, and an actuator hinge hole is provided on an end cover of the hydraulic cylinder; an open end of the cylinder liner is provided with an end cover of the motor; the spherical pump unit comprises a spherical pump and a motor, and the spherical pump and the motor are integrated in the cylinder liner; a first inlet-outlet hole and a second inlet-outlet hole of the spherical pump are respectively communicated with two working chambers in the hydraulic cylinder of the reciprocating piston mechanism; and the micro electro-hydraulic linear actuator is encapsulated in a closed elastic leather bag, and the end of the piston rod extending out from the elastic leather bag.

2. The hand of the electro-hydraulic driving robot according to claim 1, wherein the sensor comprises a position sensor and a force sensor electrically connected with controllers of the robot respectively.

3. A hand of an electro-hydraulic driving robot, comprising: a palm, a thumb, an index finger, a middle finger, a ring finger and a little finger; structures of the index finger, the middle finger, the ring finger and the little finger being the same and all comprising a first knuckle, a second knuckle and a third knuckle hinged in turn; the first knuckle being hinged on the palm through a knuckle swing support; a knuckle micro electro-hydraulic linear actuator being respectively provided in the first knuckle, the second knuckle and the third knuckle; a piston rod of the knuckle micro electro-hydraulic linear actuator in the third knuckle being hinged with the second knuckle; a piston rod of the knuckle micro electro-hydraulic linear actuator in the second knuckle being hinged with the first knuckle; a piston rod of the knuckle micro electro-hydraulic linear actuator in the first knuckle being hinged with the knuckle swing support to form a connecting rod mechanism to transmit power; a corresponding knuckle being driven to bend and stretch back and forth when the piston rod of each knuckle micro electro-hydraulic linear actuator in the first knuckle, the second knuckle and the third knuckle expands and contracts; and the thumb comprising a thumb base, a first knuckle of the thumb and a second knuckle of the thumb hinged in turn; the first knuckle of the thumb being hinged on the thumb base through a thumb swing support; a thumb micro electro-hydraulic linear actuator being respectively provided in the thumb base, the first knuckle of the thumb and the second knuckle of the thumb; the piston rod of the thumb micro electro-hydraulic linear actuator in the second knuckle of the thumb being hinged with the first knuckle of the thumb;

the piston rod of the thumb micro electro-hydraulic linear actuator in the first knuckle of the thumb being hinged with the thumb base through the thumb swing support to form a connecting rod mechanism to transmit power; corresponding knuckles being driven to bend and stretch back and forth when the piston rod of the thumb micro electro-hydraulic linear actuator in the thumb base expands and contracts; the thumb swinging left and right in a plane of the palm when the piston rod of the thumb micro electro-hydraulic linear actuator in the thumb base expands and contracts;

five palm micro electro-hydraulic linear actuators being provided in the palm; the five palm micro electro-hydraulic linear actuators being a first palm micro electro-hydraulic linear actuator, a second palm micro electro-hydraulic linear actuator, a third palm micro electro-hydraulic linear actuator, a fourth palm micro electro-hydraulic linear actuator and a fifth palm micro electro-hydraulic linear actuator, wherein the first palm micro electro-hydraulic linear actuator is configured to control the thumb base, the thumb base is hinged on the palm; the piston rod of the first palm micro electro-hydraulic linear actuator in the palm is hinged with the thumb base to form a connecting rod mechanism to transmit power; the thumb is driven to rotate back and forth to a center of the palm when a piston rod of the first palm micro electro-hydraulic linear actuator expands and contracts; the second palm micro electro-hydraulic linear actuator, the third palm micro electro-hydraulic linear actuator, the fourth palm micro electro-hydraulic linear actuator and the fifth palm micro electro-hydraulic linear actuator are respectively configured to control the index finger, the middle finger, the ring finger and the little finger;

each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator are hinged with a palm swing support; each palm wing support is hinged with a corresponding index finger, the middle finger, the ring finger and the first knuckle of the little finger to form a connecting rod mechanism to transmit power; when each of the piston rods of the second palm micro electro-hydraulic linear actuator, the third palm micro electro-hydraulic linear actuator, the fourth palm micro electro-hydraulic linear actuator and the fifth palm micro electro-hydraulic linear actuator expands and contracts; corresponding index finger, middle finger, ring finger and little finger hinged therewith is driven to swing left and right in the plane of the palm;

sensors are provided on fingertips of the third knuckle and the second knuckle of the thumb, and each sensor, each knuckle micro electro-hydraulic linear actuator, each thumb micro electro-hydraulic linear actuator and each palm micro electro-hydraulic linear actuator are electrically connected with a controller of the robot respectively.

* * * * *